US009154337B2

(12) United States Patent
Thompson et al.

(10) Patent No.: US 9,154,337 B2
(45) Date of Patent: Oct. 6, 2015

(54) NON-LINEAR TIME DOMAIN CHANNEL ESTIMATION IN OFDM SYSTEMS (71) Applicants: Steven C Thompson, San Diego, CA (US); Roee Kalinksy, San Diego, CA (US); Fernando Lopez de Victoria, San Francisco, CA (US)

(72) Inventors: Steven C Thompson, San Diego, CA (US); Roee Kalinksy, San Diego, CA (US); Fernando Lopez de Victoria, San Francisco, CA (US)

(73) Assignee: Acorn Technologies, Inc., Santa Monica, CA (US)

( * ) Notice: Subject to any disclaimer, the term of this patent is extended or adjusted under 35 U.S.C. 154(b) by 0 days.

(21) Appl. No.: 13/841,348

(22) Filed: Mar. 15, 2013

(65) Prior Publication Data
US 2014/0269883 A1    Sep. 18, 2014

(51) Int. Cl.
*H04L 27/01* (2006.01)
*H04L 25/02* (2006.01)
*H04L 27/26* (2006.01)
*H04L 25/03* (2006.01)

(52) U.S. Cl.
CPC ........ *H04L 25/0204* (2013.01); *H04L 25/0212* (2013.01); *H04L 25/0216* (2013.01); *H04L 27/2647* (2013.01); *H04L 25/022* (2013.01); *H04L 25/0224* (2013.01); *H04L 25/03159* (2013.01)

(58) Field of Classification Search
CPC ............ H04L 25/0212; H04L 25/0216; H04L 25/0218; H04L 25/0242; H04L 25/025; H04L 25/0252; H04L 25/0256; H04L 25/0258; H04L 27/2647; H04L 25/0204
See application file for complete search history.

(56) References Cited

U.S. PATENT DOCUMENTS

| 6,219,334 | B1 | 4/2001 | Sato et al. |
| 6,952,570 | B2 * | 10/2005 | Nagayasu ..................... 455/208 |
| 7,039,136 | B2 | 5/2006 | Olson et al. |
| 7,099,270 | B2 | 8/2006 | Yamaguchi |
| 7,173,945 | B1 * | 2/2007 | Liu et al. ...................... 370/516 |

(Continued)

FOREIGN PATENT DOCUMENTS

| CN | 101127753 A | 2/2008 |
| JP | 2007-515899 | 6/2007 |

(Continued)

OTHER PUBLICATIONS

Jia, et al., "Improved Channel Estimation Method Based on Time-Domain Processing for OFDM Systems", *Wireless Communications, Networking and Mobile Computing, IEEE International Conference*, pp. 13-16 (Sep. 21, 2007).

(Continued)

*Primary Examiner* — Sophia Vlahos
(74) *Attorney, Agent, or Firm* — Orrick Herrington & Sutcliffe LLP (57) ABSTRACT An OFDM receiver generates an initial channel impulse response in response to a received OFDM signal. The receiver determines the time span within the initial channel impulse response in which significant paths are present. An intermediate channel impulse response estimator identifies paths within the initial channel impulse response and generates an improved intermediate channel impulse response. A channel impulse response estimator performs a second non-linear process to generate a channel impulse response. An equalizer responds to the channel impulse response and the OFDM symbol to equalize the OFDM symbol. Metrics are generated that can be used for effectively stopping the second iterative non-linear process.

20 Claims, 3 Drawing Sheets

(56) References Cited

U.S. PATENT DOCUMENTS

| | | | |
|---|---|---|---|
| 7,289,049 B1 | 10/2007 | Fudge et al. | |
| 7,394,876 B2 | 7/2008 | Sestok, IV et al. | |
| 7,609,616 B2 | 10/2009 | Jacobsen | |
| 7,639,738 B2 | 12/2009 | Lopez de Victoria | |
| 7,675,962 B2 * | 3/2010 | Mergen et al. | 375/147 |
| 7,697,412 B2 | 4/2010 | Anderson et al. | |
| 7,697,449 B1 | 4/2010 | Shirali et al. | |
| 7,787,572 B2 | 8/2010 | Scharf et al. | |
| 7,848,463 B2 | 12/2010 | Li et al. | |
| 7,970,078 B2 * | 6/2011 | Wu et al. | 375/316 |
| 7,995,688 B2 | 8/2011 | Hong et al. | |
| 8,615,048 B2 * | 12/2013 | Liao et al. | 375/260 |
| 2004/0219883 A1 | 11/2004 | Pauli et al. | |
| 2005/0075845 A1 | 4/2005 | Thomas et al. | |
| 2005/0147026 A1 | 7/2005 | Jones, IV et al. | |
| 2005/0180364 A1 | 8/2005 | Nagarajan et al. | |
| 2006/0029279 A1 | 2/2006 | Donoho | |
| 2006/0153283 A1 | 7/2006 | Scharf et al. | |
| 2006/0203710 A1 * | 9/2006 | Mukkavilli et al. | 370/208 |
| 2006/0291578 A1 | 12/2006 | Singh et al. | |
| 2008/0117995 A1 | 5/2008 | Anderson et al. | |
| 2008/0130771 A1 * | 6/2008 | Fechtel et al. | 375/260 |
| 2008/0151989 A1 | 6/2008 | Von Elbwart et al. | |
| 2008/0228446 A1 | 9/2008 | Baraniuk et al. | |
| 2010/0002788 A1 | 1/2010 | Wu et al. | |
| 2010/0158141 A1 * | 6/2010 | Hewavithana et al. | 375/260 |
| 2010/0272194 A1 | 10/2010 | Zhengang et al. | |
| 2010/0284478 A1 | 11/2010 | Liao et al. | |
| 2011/0026577 A1 | 2/2011 | Primo et al. | |
| 2011/0069796 A1 | 3/2011 | Scharf et al. | |
| 2011/0096767 A1 | 4/2011 | Narayan et al. | |
| 2011/0122789 A1 | 5/2011 | Haustein et al. | |
| 2011/0142118 A1 | 6/2011 | Seo et al. | |

FOREIGN PATENT DOCUMENTS

| | | | |
|---|---|---|---|
| JP | 2008-536359 | 9/2008 | |
| JP | 2009-081535 | 4/2009 | |
| WO | WO2007/095697 A1 * | 8/2007 | H04L 25/02 |
| WO | WO 2007/149297 A1 | 12/2007 | |
| WO | WO 2008/136184 | 11/2008 | |
| WO | WO 2010/090787 A1 | 8/2010 | |
| WO | WO 2011/066271 | 6/2011 | |
| WO | WO 2011/160190 A1 | 12/2011 | |
| WO | WO 2013/074271 A1 | 5/2013 | |

OTHER PUBLICATIONS

Lin, et al., "A Novel Channel Estimation Method Using Virtual Pilots in MIMO OFDM Systems", *IEICE Transactions on Communications*, E91-B(11):3764-3767 (Nov. 2008).

Sun, et al., "A Time Domain Iteration-based Channel Estimation Method in OFDM System with Null Subcarriers", *2010 IEEE Vehicular Technology Conference*, pp. 1-5 (May 16-19, 2010).

Werner, et al., "Low-Complexity Time-Domain Channel Estimators for Mobile Wireless OFDM Systems", *Proc. IEEE Workshop on Signal Processing System Design and Implementation, IEEE*, pp. 245-250 (Nov. 2, 2005).

Werner, et al., "Combined Frequency and Time Domain Channel Estimation in Mobile MIMO-OFDM Systems", *2006 IEEE International Conference on Toulouse, France*, p. IV373-IV376 (May 14-19, 2006).

Abari, et al., "Low complexity channel estimation for LTE in fast fading environments for implementation on multi-standard platforms," IEEE, Vehicular Technology Conference, Sep. 6-9, 2010, pp. 1-5.

Arslan, et al., "Interference mitigation and awareness for improved reliability," Reliable Communications for Short-range Wireless Systems, 2011, pp. 190-233, Cambridge University Press, United Kingdom.

Berger, et al., "Sparse Channel Estimation for Multicarrier Underwater Acoustic Communication: From Subspace Methods to Compressed Sensing," IEEE, Signal Processing, Mar. 2010, pp. 1708-1721, vol. 58, Issue 3.

Berger, et al., "Sparse Channel Estimation for OFDM: Over-Complete Dictionaries and Super-Resolution," IEEE Signal Processing Advances in Wireless Communications, 2009, Jun. 21-24, 2009, pp. 196-200.

Blumensath, et al. "Gradient Pursuits," IEEE, Signal Processing, Jun. 2008, pp. 2370-2382, vol. 56, Issue 6.

Budiarjo, et al., "On the Use of Virtual Pilots with Decision Directed Method in OFDM Based Cognitive Radio Channel Estimation Using 2x1-D Wiener Filter," IEEE, Communications, May 19-23, 2008, pp. 703-707.

Candes, "Compressive sampling," Proceedings of the International Congress of Mathematicians, 2006, pp. 1-20, Madrid, Spain.

De Baynast, et al., "Chip-level LMMSE Equalization for Downlink MIMO CDMA in Fast Fading Environments," IEEE Global Telecommunications Conference, Nov. 29-Dec. 3, 2004, pp. 2552-2556, vol. 4.

Doukopoulos, et al., "Robust Channel Estimation via FFT Interpolation for Multicarrier Systems," IEEE, Vehicular Technology Conference, Apr. 22-25, 2007, pp. 1861-1865.

Edfors, et al. "Analysis of DFT-Based Channel Estimators for OFDM," Wireless Personal Communications, 2000, pp. 55-70, vol. 12.

Edfors, et al., "OFDM Channel Estimation by Singular Value Decomposition," IEEE Communications, Jul. 1998, pp. 931-939, vol. 46, Issue 7.

Fornasier, et al., "Compressive Sensing," Apr. 18, 2010, pp. 1-49.

Haimovich, et al. "An Eigenanalysis Interference Canceler," Jan. 1991, vol. 39, No. 1.

Hoeher, et al., "Two-Dimensional Pilot-Symbol-Aided Channel Estimation by Wiener Filtering," IEEE, Acoustics, Speech, and Signal Processing, Apr. 21-24, 1997, pp. 1845-1848, vol. 3.

Huang, et al., "Kalman-filter-based channel estimation for orthogonal frequency-division multiplexing systems in time-varying channels," IET, Communications, Aug. 2007, pp. 795-801, vol. 1, Issue 4.

Kinjo, "Time domain channel estimation schemes for OFDM systems with multiple antenna transmissions," IEEE, Intelligent Signal Processing and Communication Systems, Jan. 7-9, 2009, pp. 232-235.

Le Saux, et al., "Robust Time Domain Channel Estimation for Mimo-OFDMA Downlink System," Electrical Engineering, 2007, pp. 357-366, vol. 1.

Maechler, et al., "Implementation of Greedy Algorithms for LTE Sparse Channel Estimation" Signals, Systems and Computers (ASILOMAR), Nov. 7-10, 2010, pp. 400-405.

Maechler, et al., "Matching Pursuit: Evaluation and Implementation for LTE Channel Estimation," IEEE, Circuits and Systems (ISCAS), May 30-Jun. 2, 2010, pp. 589-592.

Mallat, et al., "Matching Pursuits With Time-Frequency Dictionaries," IEEE, Signal Processing, Dec. 1993, pp. 3397-3415, vol. 41, Issue 12.

Özbek, et al., "Pilot-Symbol-Aided Iterative Channel Estimation for OFDM-based Systems".

Ozdemir, et al. "Channel Estimation for Wireless OFDM Systems," IEEE Communications, 2007, pp. 18-48, vol. 9, No. 2.

Pati, et al., "Orthogonal Matching Pursuit: Recursive Function Approximation with Applications to Wavelet Decomposition," Signals, Systems and Computers, Nov. 1-3, 1993, pp. 40-44, vol. 1.

Rinne, et al, "Pilot Spacing in Orthogonal Frequency Division Multiplexing Systems on Practical Channels," IEEE, Consumer Electronics, Nov. 1996, pp. 959-962, vol. 42, Issue 4.

Saeed, et al., "MIMO OFDM Channel Estimation Based on RLS Algorithm: the Time-versus Frequency-domain Implementations," Communications, 2007. Asia-Pacific Conference on Communications, Oct. 18-20, 2007, pp. 547-550.

Schafhuber, et al., "Adaptive Wiener Filters for Time-Varying Channel Estimation in Wireless OFDM Systems," IEEE, Acoustics, Speech and Signal Processing, Apr. 6-10, 2003, pp. 688-691, vol. 4.

Tauböck, et al., "A Compressed Sensing Technique for OFDM Channel Estimation in Mobile Environments: Exploiting Channel Sparsity for Reducing Pilots," IEEE, Acoustics, Speech and Signal Processing, Mar. 31-Apr. 4, 2008, pp. 2885-2888.

Van De Beek, et al. "On Channel Estimation in OFDM Systems," Vehicular Technology Conference, Jul. 25-27, 1995, pp. 815-819, vol. 2.

(56) References Cited

OTHER PUBLICATIONS

Wan, et al., "The Modified Iterative Detector/Estimator Algorithm for Sparse Channel Estimation," OCEANS 2010, Sep. 20-23, 2010, pp. 1-6.

Wang, et al., "A New Channel Estimation Method Based on Distributed Compressed Sensing," IEEE, Wireless Communications and Networking Conference, Apr. 18-21, 2010, pp. 1-4.

Wu, et al., "Channel Estimation for OFDM Systems with Subspace Pursuit Algorithm," ICGCS, Green Circuits and Systems, Jun 21-23, 2010, pp. 269-272.

Yücek, et al., "A Comparative Study of Initial Downlink Channel Estimation Algorithms for Mobile WiMAX," IEEE, Xplore Digital Library, Mar. 25-29, 2007, pp. 32-37.

Zhao, et al., "A Novel Channel Estimation Method for OFDM Mobile Communication Systems Based on Pilot Signals and Transform-Domain Processing," IEEE $47^{th}$ Vehicular Technology Conference, May 4-7, 1997, pp. 2089-2093, vol. 3.

Johan Lofgren, et al., "Improved matching pursuit algorithm and architecture for LTE Channel Estimation," *Circ. and Sys.* (*ISCAS*) *Proceedings of 2011*, 2011 IEEE International Symposium pp. 466-469 May 15, 2011).

\* cited by examiner

NON-LINEAR TIME DOMAIN CHANNEL ESTIMATION IN OFDM SYSTEMS

COPYRIGHT NOTICE/PERMISSION

A portion of the disclosure of this patent document contains material which is subject to copyright protection. The copyright owner has no objection to the facsimile reproduction by anyone of the patent document or the patent disclosure as it appears in the Patent and Trademark Office patent file or records, but otherwise reserves all copyright rights whatsoever. This notice applies to the software and data as described below and in the drawings.

BACKGROUND

1. Field of the Invention

The present invention relates to a system and a method for processing communication signals to more efficiently achieve channel estimation, particularly in providing channel estimation in an orthogonal frequency division multiplexing (OFDM) receiver.

2. Description of the Related Art

To increase data rates and mitigate multipath, advanced networks including so-called 4G wireless networks such as WiMAX and LTE (long-term evolution) have adopted variations of the orthogonal frequency division multiplexing (OFDM) waveform for their PHY layer. The PHY layer is the physical, electromagnetic means by which bits of information are transmitted and received over the air or wire. OFDM offers much sought-after bandwidth efficiency, with a built-in mitigation for the multipath of the wireless channels in urban environments. The sensitivities of OFDM transmission are well-understood. The "bit-pump" scheme for the PHY layer has proven successful in digital subscriber line (DSL, wired) OFDM applications. On the other hand, mobile wireless OFDM applications still face challenges to achieve OFDM's designed capacity.

At the core of the practical and theoretical advantages of OFDM is the use of a fast Fourier transform (FFT). The FFT implemented in OFDM can be viewed as analogous to a bank of tuners for $N_c$-simultaneous radio stations because each of the tones generated by the FFT can be independently assigned to users. The OFDM PHY provides or receives a simultaneous blast, over a short period of time, of bits on each carrier frequency (tone) with a complete, or partial, allocation of carriers to a given user. Making a partial allocation of carriers among different users and aggregating many users within one period is one multiple-access scheme for OFDM. In the case of 10 MHz bandwidth channels, a user can be receiving up to $N_c$=840 (WiMAX) or 600 (LTE) simultaneous tones, over a very short duration, such as 0.1 milliseconds. These $N_c$ tones per period of time make up an OFDM symbol. The allocation of many users in one symbol is called OFDMA.

Wireless standards usually consist of three important time segments, defined by the bandwidth available and the information's time sensitivity. Symbols are concatenated to define a frame, which is the longest relevant unit of time and for example might be one millisecond. If the standards assign ten symbols to a frame, then the symbol duration is 0.1 milliseconds. Finally, the FFT size and cyclic prefix (CP) duration define the time spacing between samples, so a 1024 point FFT and 128 point CP define a sampling interval of 11 microseconds. Although FFT computations can be comparatively efficient, the FFT size for an exemplary OFDM system is sufficiently large (e.g., 1024 samples in the 10 MHz bandwidth case) that computational demands remain rather high and power consumption remains an important constraint in designing receivers for user handsets.

OFDM systems are more sensitive and have less robust signal acquisition than 3G systems based on code division multiple access (CDMA). The sensitivity of OFDM systems comes from their use of the fast Fourier transform (FFT) to transform incoming signals from the time to frequency domain. The FFT in OFDM systems can deviate from ideal assumptions under very common real-world conditions and receiver implementations. If the assumptions underlying the FFT algorithm fail, cross talk develops between all of the $N_c$-channels (on $N_c$ carriers) being transmitted. Crosstalk between carriers degrades performance, which in turn causes bit error rates (BER) to increase.

A wireless OFDM handset may receive multiple paths (copies with different delays) of the same signal from a transmission tower ("base station") due to reflections from structures or large water surfaces. This non-line-of-sight reception or multipath causes the signal to be distorted from the flat frequency domain "shape" output by the transmitter. A receiver must compute a filter to restore the signal to its original flat spectral shape; that filter is said to equalize the signal. OFDM receivers perform a critical equalization computation for each OFDM symbol transmitted.

OFDM, unlike most other modulation strategies commonly used in communication systems, can include two equalizers to improve signal quality: a time equalizer (TEQ) and a frequency equalizer (FEQ). Some OFDM applications such as DSL include a time equalizer while others, such as systems that implement current wireless standards, do not demand a time equalizer. All practical OFDM receivers have a frequency equalizer. Whether a receiver includes a time equalizer or only a frequency equalizer, the receiver needs to perform channel estimation to at least initially determine values of the equalizer coefficients before the equalizer can be used to improve the signal quality. Determining the coefficients for frequency equalizers typically is performed in the frequency domain.

An OFDM communication system typically includes an OFDM transmitter that generates radio signals modulated with information such as data generated by a computer network or voice data. The radio signal travels to a receiver over a channel that distorts the radio signal in various ways, including by transmission over multiple paths of different lengths, introducing multiple copies of the radio signal with different offsets and amplitudes in the mechanism known as multipath. Receiver circuitry down converts the received signal to baseband and then analog-to-digital converts that signal to produce the information signal that is subject to OFDM processing. The radio signal is aligned temporally. Following alignment, the signal is processed to remove the cyclic prefix (CP) from the signal. The cyclic prefix is present because OFDM transmitters add a CP of length $N_{CP}$, which consists of the last $N_{CP}$ samples, to an information signal waveform of length N so that the digital signal that the transmitter converts to analog and transmits is of length N+$N_{CP}$. An initial step of the receiver's reverse conversion process then is to remove and discard the added $N_{CP}$ cycle prefix samples. Following that step, a serial to parallel conversion element organizes and converts the serial signal into a parallel signal for further processing. The cycle prefix can be removed either before or after the serial to parallel conversion.

After CP removal the parallel data is provided to a fast Fourier transform (FFT) processor that converts the time domain samples s(n) to a set of frequency domain samples $R_i(k)$ for processing. The received OFDM symbol is assumed to be corrupted by the channel, which is assumed for OFDM to introduce amplitude and phase distortion to the samples from each of the carrier frequencies used in the OFDM system. A frequency equalizer (FEQ) applies an amplitude and phase correction specific to each of the frequencies used in the OFDM system to the various samples transmitted on the different frequencies. The FEQ needs an estimate of the channel's amplitude and phase deviations from ideal at each frequency to determine what corrections to apply.

A typical OFDM channel estimator receives and estimates in the frequency domain a channel based on a set of pilot tone locations and received pilot signals. This is termed frequency domain channel estimation or FDCE. The pilot tones (or just pilots) are typically one or two bit symbols dictated by the relevant standards so that the receiver knows the expected pilot locations and values a priori. All FDCE implementations react to the OFDM symbol output by the FFT to extract the received pilot signals. The channel estimate at each pilot may be determined as the amplitude and phase rotation from the ideally expected post-demodulation value of "+1" for each pilot. Any deviation from this "+1" value constitutes the distortion from the channel at that frequency's bandwidth. The value of the channel at the data carrier frequencies can be estimated by interpolating the values obtained at the pilot carrier frequencies. Various improvements on simple channel estimation schemes are known and are conventionally implemented in the frequency domain. The frequency equalizer receives the signals from the fast Fourier transform processor and the channel estimates from the estimator and equalizes the signal. The output of the equalizer typically is provided to a parallel to serial element that converts the parallel outputs of the equalizer to a serial output user signal.

An OFDM symbol is constructed by setting active data carrier values to non-zero values from a prescribed set of values according to the number of bits to be "loaded" into that OFDM symbol. These values are then subjected to an inverse fast Fourier transform (IFFT) to obtain the time-domain samples. The cyclic prefix is appended to the beginning of the symbol by taking a defined number of samples from the end of a symbol's sequence of time-domain samples. The IFFT might, for example, produce 1024 samples. Certain standards select the CP to have length 128. That means the transmitter selects the last 128 samples from the sequence of 1024 samples and pre-pends those samples so that they become the first 128 samples in the transmitted OFDM symbol, which has a total of 1152 samples. Because of this construction, selecting any 1024 samples out of the 1152 samples of the OFDM symbol produces a circular shift on the original 1024 OFDM time domain samples.

In the case of the WiMAX standard, the OFDM symbol can be transmitted on 60 subchannels with 14 active carriers per subchannel, for a total of 840 active carriers, with 4 pilots per subchannel. The locations of the pilots in any given symbol, and therefore subchannel, are prescribed by the standard. OFDM schemes for high-throughput networks seek to minimize the overhead, and this includes the number of training carriers within a symbol. Reducing the number or density of pilots can limit the ability of receivers to efficiently recover information from a signal.

One theoretical advantage of OFDM is that equalization can be performed after the FFT for each received tone individually through a rather simple algorithm. Another advantage that enables OFDM receivers is that equalizer coefficients need only be estimated for each subcarrier that is relevant to the user, a quantity smaller than the FFT size. The values for each equalizer coefficient corresponding to each tone will depend on the estimation of the channel coefficient—termed channel estimation. Like many operations in OFDM receivers, typical OFDM receivers perform channel estimation after the FFT because the channel estimation at that point is performed simply and efficiently based on a user's tone allocation. Because channel estimation is performed after the FFT, the tones will be impacted by FFT and post-FFT distortions, known as inter-carrier interference (ICI). ICI generally manifest through three conditions: 1) errors in frequency tuning; 2) Doppler from mobility; and 3) interference from other cell-sites. OFDM systems accommodate inter-symbol interference by providing a time gap between symbols, so that inter-symbol interference generally is of less concern for OFDM as compared to other wireless schemes.

Any given channel has a well-known limit to its capacity. In current OFDM implementations, there are additional losses in capacity below the expected rates. Channel estimation errors are a principal culprit. Since ICI affects the channel estimation algorithms post-FFT in typical implementations, poor channel estimation leads to inaccurate equalizer coefficients. Increased bit error rate (BER), due to myriad conditions such as demanding channels and poor channel estimation, can be accommodated by reducing the transmitted bit rate offered to a user. In effect, reducing the transmitted bit rate allows for robustness against interference. However, this is a non-linear correction, since the OFDM scheme allows for transmission of two, four or six bits per tone and consequently, under some circumstances, mitigating distortion requires fewer than 2 bits per tone be transmitted, which means the system makes no data available to the user at all.

SUMMARY OF THE PREFERRED EMBODIMENTS

An aspect of the invention provides an OFDM receiver comprising an initial channel impulse response estimator that generates an initial channel impulse response having a number of samples in response to a received signal having one or more OFDM symbols. A time segment selector selects a subset of samples from the initial channel impulse response as a first intermediate channel impulse response. An intermediate channel impulse response estimator identifies paths within the initial channel impulse response and generates an improved intermediate channel impulse response in a first non-linear process. A channel impulse response estimator responsive to the intermediate channel impulse response estimator performs a second non-linear process to generate a channel impulse response. An equalizer responds to the channel impulse response and the OFDM symbol to equalize the OFDM symbol.

In a further aspect of the present invention, the first and second non-linear processes are modified matching pursuit processes.

DETAILED DESCRIPTION OF THE PREFERRED EMBODIMENTS

OFDM receivers can use time domain channel estimators (TDCEs) to estimate a channel's impulse response (CIR) over a predetermined duration. OFDM receivers that use CIR (time domain) estimation are not typical. The dominant OFDM receiver architecture estimates the channel's frequency response (CFR) over a number of predetermined carriers assigned to the user.

CFR estimation has two considerable advantages: 1) it estimates the channel using only the subset of pilots assigned to the user within one symbol; and 2) it avoids additional time-frequency transformation(s). CFR estimation also has two considerable disadvantages: 1) performance degradation due to the loss of carrier orthogonality associated with channel conditions that include carrier offset, doppler shifts or channels with CIRs that exceed the cycle prefix; and 2) sophisticated network broadcast configurations that challenge the ability of CFR-based receivers to mitigate interference or poor pilot density. System designers thus have to weigh the benefits of low complexity for CFR estimators against the considerable increases in network capacity that can be achieved by adopting receivers that use CIR estimators.

There are two salient considerations for time domain channel estimation: 1) the computational complexity and stability/convergence of highly accurate methods; and 2) the identification of the true time span of the actual channel impacting the OFDM symbol(s) being processed. Preferred aspects of the present invention adopt one or more strategies that together insure convergence and robustness of non-linear CIR estimators. One strategy is to perform CIR selection in a manner that determines the time span that contains the most significant paths in the initial time domain CIR estimate. Further to this CIR selection, there are additional preferred strategies to improve upon the initial CIR estimate to generate an intermediate CIR estimate. A preferred non-linear CIR estimator then reacts to this intermediate CIR estimate and additionally reacts to other metrics from the intermediate CIR estimate calculation to limit the number of iterations that produce the final CIR estimate, while simultaneously increasing the likelihood of convergence and successful stopping for the preferred iterative non-linear process.

Figure 1:
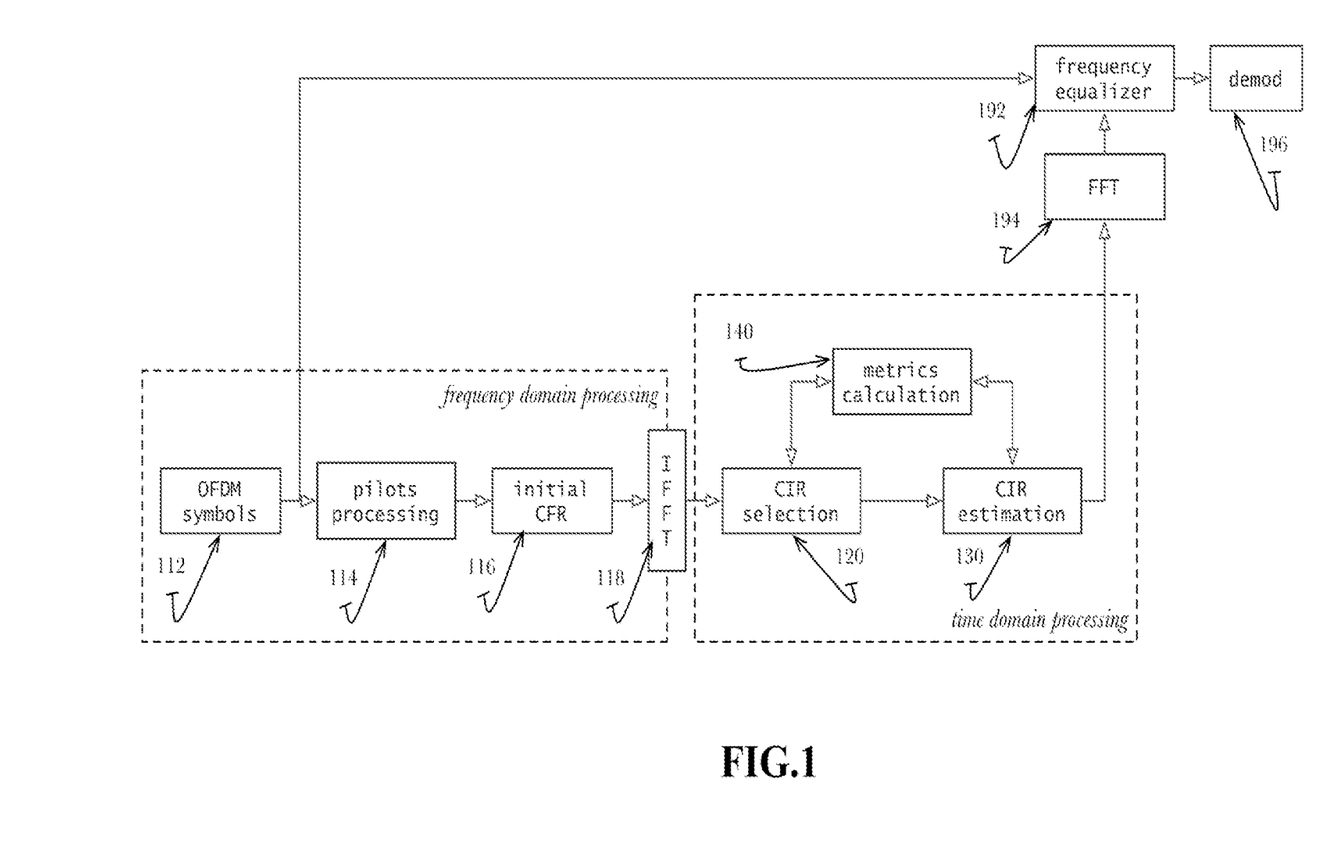
FIG. 1 schematically illustrates an OFDM receiver including a frequency domain channel estimator for determining an initial channel frequency response and a CIR selection module that preferably determines a span for the initial CIR and then performs further CIR estimation in the time domain channel estimation.

FIG. 1 illustrates the simplicity offered by OFDM systems for obtaining at least an initial channel estimate in the frequency domain. Received OFDM symbols 112, already in the frequency domain, preferably are stripped of the data carriers to measure the deviations in the received pilot signals from the expected values at the pilot carriers 114. The receiver's initial CFR estimator 116 determines at least an initial channel frequency response (CFR). Preferably the initial CFR estimator 116 determines the initial CFR estimate by multiplying each of the received pilot values by the conjugate of its corresponding transmitted values and then nulling all data carriers to a zero value. In prevalent conventional OFDM receivers, this initial CFR estimate 116 is provided directly to a frequency equalizer module 192 to complete the basic task of frequency equalization of OFDM symbols through frequency domain channel estimation. The FIG. 1 receiver instead preferably includes additional circuitry that facilitates the generation of more accurate channel estimates.

In the FIG. 1 receiver, the initial CFR estimator 116 provides the initial CFR to the inverse fast Fourier transform (IFFT) 118 that transforms the frequency domain initial CFR estimate to the time domain. The transformed CFR value is taken as the initial time domain channel impulse response (CIR), and the IFFT 118 outputs the initial CIR to the CIR selection module 120. CIR selection module 120 preferably is responsive to the initial CIR to select an appropriate span within the initial CIR that contains the significant paths for further processing. Before that, it is sometimes advantageous for the CIR selection module 120 to improve upon the initial CIR estimate, and output an intermediate CIR estimate for improved performance if that can be achieved with comparatively little additional calculation complexity (as is the case with the implementation discussed here). The CIR estimator 130 receives the CIR selection, which is preferably an intermediate CIR selection, and preferably performs further time domain channel estimation.

Preferably the CIR selection module 120 and the CIR estimation module 130 use iterative methods that react to metrics calculated in prior iteration(s) and/or initialization values. In the FIG. 1 implementation, the metrics calculation module 140 determines doppler, SNR or other metrics as desired. The metrics calculation module 140 preferably is responsive to the values provided by the CIR selection module 120, and in turn, the CIR selection module 120 preferably is responsive to values from the metrics calculation module 140 for its next iteration. The CIR estimator 130 preferably reacts to the CIR selection module 120 and the metrics calculation module 140 to initialize the preferred iterative estimation method. Likewise, preferably, the metrics calculation module 140 is responsive to values from the CIR estimation module 130, and in turn, the CIR estimation module 130 preferably reacts to the metrics calculation module 140 prior to the next iteration.

The CIR estimation module 130 preferably also reacts to an intermediate CIR estimate from module 120, and additional metrics calculated from this intermediate CIR estimate to initialize the iterative method in the CIR estimation module 130. CIR estimation 130 preferably reacts to metrics calculated during CIR selection and further reacts to additional metrics calculated from the metric calculation module 140. The CIR estimator module 130 output is coupled to, for example, an FFT module 194 that transforms the time domain CIR into the frequency domain for an equalizer 192 to equalize the corresponding OFDM symbol. The illustrated circuits may also perform simple adjustments to calculate the proper representation, due to time-shifts, of the CIR in the frequency domain.

The illustrated preferred CIR selection module 120 and CIR estimation module 130 use non-linear iterative methods and metrics for the reliable convergence of such iterative methods. Preferably the metrics calculation module 140 determines these metrics, preferably using the pertinent interconnectivity as described here. In preferred receiver implementations, the combination of these three modules 120, 130 and 140 provide channel estimation for a high-performance OFDM receiver, responsive to a frequency domain OFDM symbol, by performing time domain estimation of a CIR, and uses the CIR to generate the frequency domain channel estimate to equalize a corresponding OFDM symbol in the frequency domain.

Figure 2:
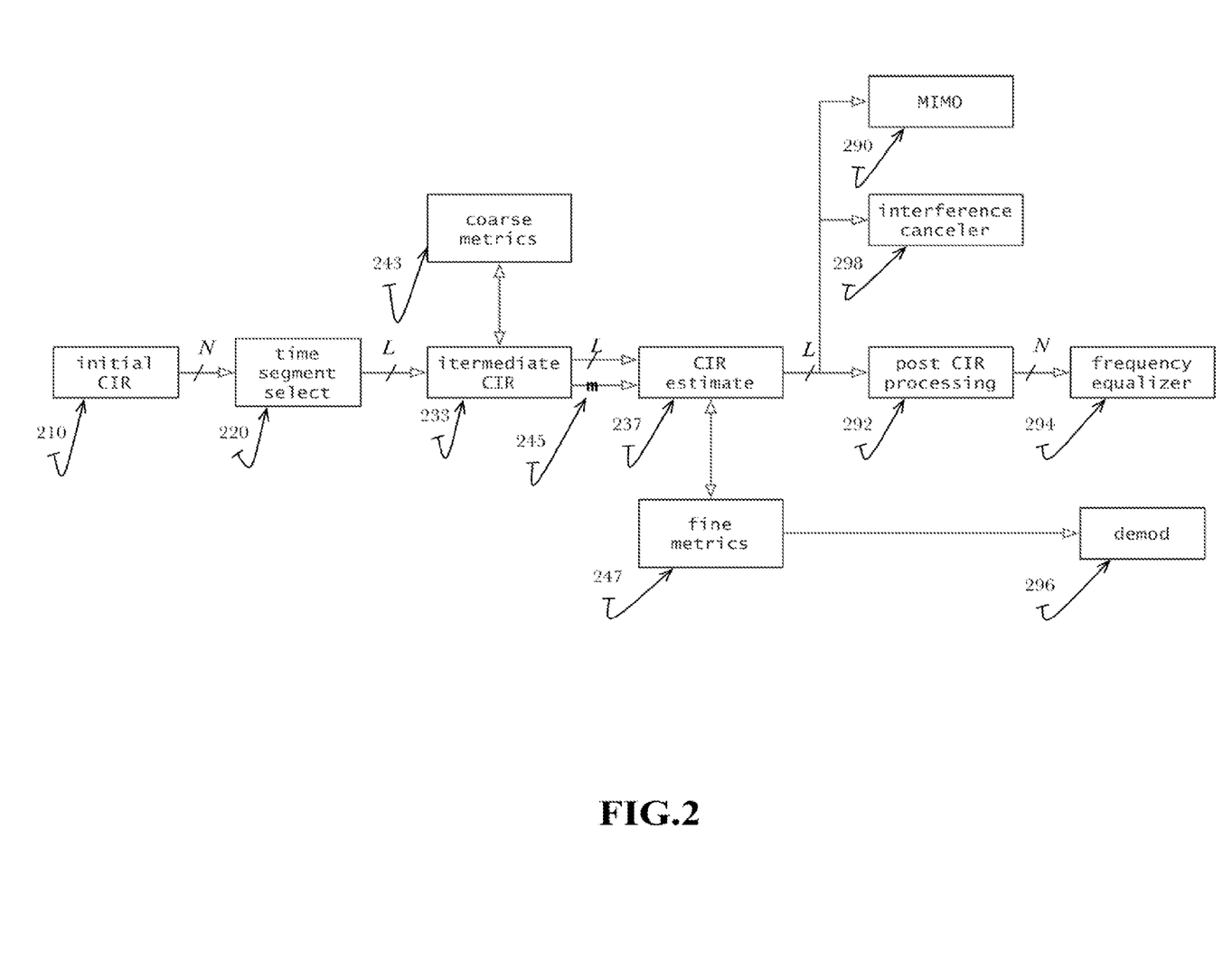
FIG. 2 schematically illustrates an OFDM receiver according to aspects of the present invention including an initial CIR estimator, an intermediate CIR estimator, a final CIR estimator and a frequency equalizer.

FIG. 2 is a functional block diagram of a preferred OFDM receiver that performs time domain channel estimation using a non-linear, iterative process to determine an intermediate CIR within intermediate CIR estimation module 233 and preferably uses in final CIR estimation module 237 a similar non-linear strategy to determine the CIR estimate in final CIR estimation module 237. The FIG. 2 receiver is generally the same as the FIG. 1 receiver but the functional blocks have been rearranged and subdivided to better illustrate the operation of the preferred OFDM receiver. Initial CIR module 210 preferably performs an inverse FFT of the channel measurements at the known pilot carriers, in the manner discussed above with respect to FIG. 1. Typically, the initial CIR estimate has N samples because it is produced by the inverse FFT of the initial channel estimate in the frequency domain. N=1024 is a standard FFT value in LTE (long term evolution) OFDM configurations. The initial CIR estimator 210 generates the initial CIR estimate and outputs the N sample initial CIR to the time segment selector 220, which reacts to the initial CIR Time segment select module 220 advantageously selects L samples out of N samples so that the selected L samples contain, for example, the greatest energy concentration available in the N samples. It is desirable for the time segment selector 220 to select a segment including all important paths in the channel from within the observed time span. Due to coarse timing adjustments in the initialization of the receiver, the L samples, while contiguous, may "wrap around" due to the cyclical nature of the FFT.

Figure 3:
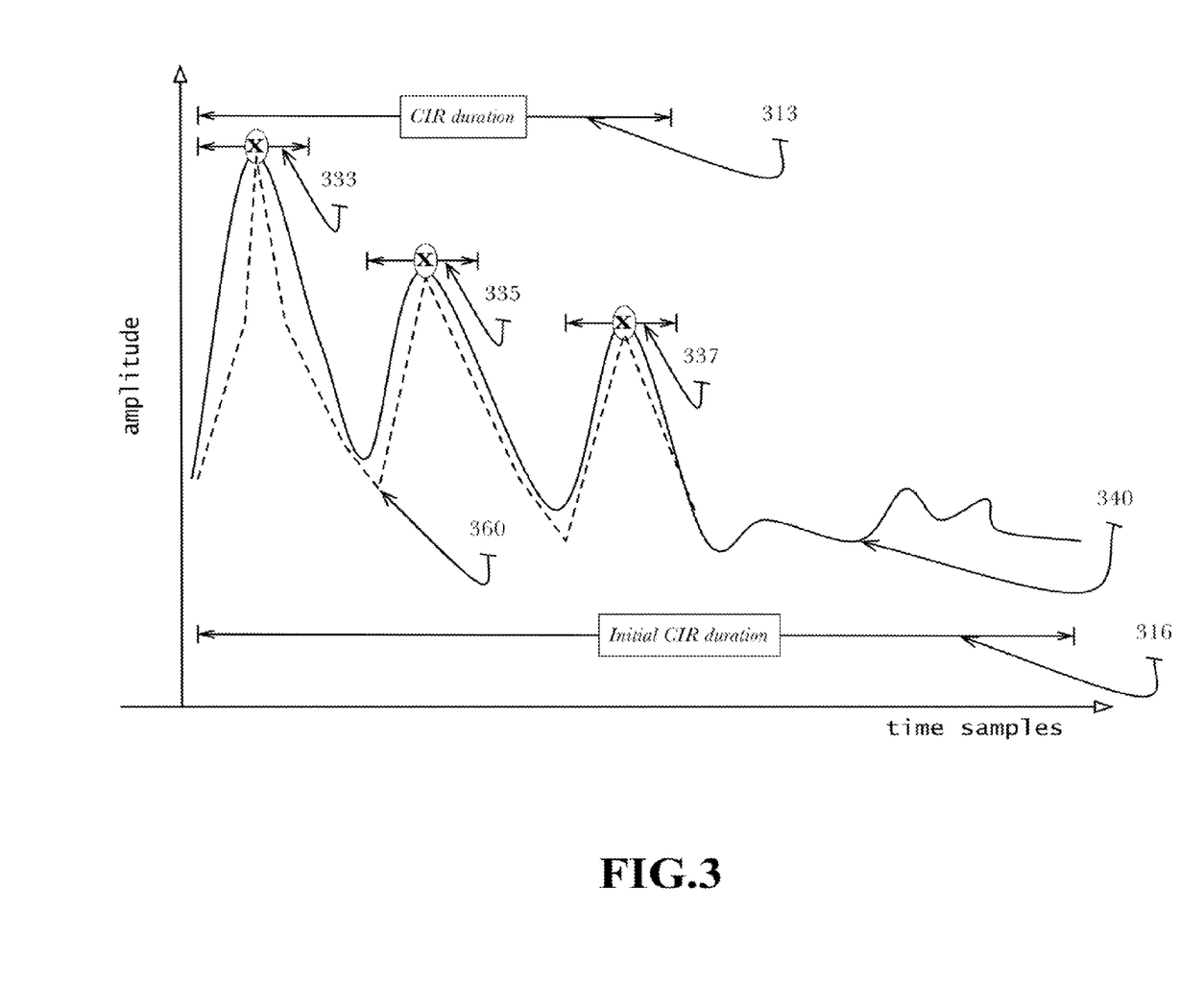
FIG. 3 illustrates aspects of a time domain channel estimation process with reference to an initial channel estimate.

FIG. 3 helps to illustrate the operation of the time segment selector 220. The output of the initial CIR module 210 consists of N samples, but the channel will not span the entire duration of FFT samples. The receiver architecture preferably determines a robust maximum channel length L for use in the receiver. The value of L may exceed the cyclic prefix—a well defined OFDM symbol construction parameter—because such channel conditions are expected under certain conditions in practical deployed networks. Therefore, the value of L preferably is taken to be the cyclic prefix length plus some judiciously chosen margin. In FIG. 3, an arbitrary value of N is shown to span the duration noted by the initial CIR duration 316. Time segment selector 220 reacts to the N samples in the initial CIR estimate to select L samples extending over the reduced time span indicated as the CIR duration 313 in FIG. 3.

In a preferred implementation, the time segment selector 220 need not select the L samples out of N according to a highly accurate criterion. An energy maximization criterion may be sufficient for the selector 220. The reason for this lax criterion is that the intermediate CIR module 233 preferably identifies the peaks of the high-likelihood paths, noted in the FIG. 3 example with an "X" as 333, 335 and 337. Additionally, the intermediate CIR module 233 preferably identifies the areas the CIR estimate module 237 is likely to categorize.

The intermediate CIR module 233 in FIG. 2 preferably identifies the paths present in the initial CIR estimate waveform 340, which has been truncated to L samples by the time segment selector 220. Further to this path identification, the initial CIR estimate may be improved, as shown in waveform 360, so that the CIR estimator 237 is capable of determining a more refined CIR estimate.

The intermediate CIR module 233 is responsive to an initial CIR estimate and controlled by metrics preferably determined and output by the coarse metric module 243 at each iteration of the preferred strategy for identifying the likely paths in the channel spanned by L samples. The intermediate CIR module 233 preferably implements the procedure set out below. The coarse metrics module preferably implements the coarse metrics procedure set forth below the intermediate CIR procedure. The intermediate CIR procedure 233 is non-linear on account of step 4.6, performed by the coarse metrics module 243 as step 5.1 of the coarse metrics procedure, which selects the maximum among the magnitude-squared elements of the vector c.

| PROCEDURE: Intermediate CIR 233 |  |
|---|---|
| 4.1. | compute a transmit pilot auto-covariance matrix A. |
| 4.2a. | input an L-sample initial CIR ($h_0$) |
| 4.2b. | set instant_snr_thresh, iter_max, and $d_{range}$ |
| 4.3. initialize: |  |
|  | $h_i = 0$; iter= −1; |
|  | c= $h_0$; exit_while= 0; |
| 4.4. | while( not( exit_while) ) do |
| 4.5. | iter= iter + 1; |
| 4.6. | [max_indx, peak] = Coarse_Metric( c ); |
| 4.7. | c= c − c(max_indx)*A(:, max_indx); |
| 4.8. | [ instant_snr ]= Coarse_Metric( c, peak ); |
| 4.9. | if( instant_snr < instant_snr_thresh ) then |
| 4.10. | exit_while= 1; |
| 4.11. | else |
| 4.12. | d(iter)= max_idx; |
| 4.13. | $h_i$(max_idx)= $h_i$(max_idx) + c(max_idx); |
| 4.14. | end if |
| 4.15. | if iter > iter_max then |
| 4.16. | exit_while= 1; |
| 4.17. | end if |
| 4.18. end while |  |
| 4.19. generate the mask vector m from d with $d_{range}$ tolerance |  |
| 4.20. output $h_i$, m |  |

Fundamentally, the intermediate CIR module 233 uses preferred iterative non-linear strategies derived from matching pursuit optimization to identify the paths such as exemplary paths 333, 335 and 337 designated with an "X" in the example of FIG. 3. This is the result of step 4.13 of the intermediate CIR procedure that "builds up" from zero—as $h_1$ is initialized to zero—by adding the most likely paths based on the non-linear measure of step 4.6 in an iterative and additive approach. For each iteration, the intermediate CIR estimator 233 passes the vector c to the coarse metrics module 243. Consequently, the intermediate CIR module 233 preferably proceeds to add a candidate path (step 4.13) at each iteration, until the instantaneous SNR estimate is decreased below a threshold. This instantaneous SNR measure relates the power of the last likely path identified to a measured noise floor.

The resulting intermediate CIR estimate $h_1$—in step 4.13 of the intermediate CIR procedure—is termed as such, since the stopping measure of step 5.4 of the coarse metrics procedure is designed to be sufficient for the detection of the peaks, and an improvement on the L-sample truncated initial CIR 340.

The intermediate CIR module 233 includes an initialization procedure for the variable instant_snr_thresh in step 4.2b that controls the quality of the intermediate CIR result. Through simulations, the maximum number of iterations (iter_max) and the stopping threshold (instant_snr_thresh) can be ascertained such that the significant peaks, with the desired sensitivity, are consistently identified. The procedure intermediate CIR declares a path significant when the coarse metrics module 243 determines that a path under consideration produces an instantaneous SNR above a predetermined level. This approach to rank and identify significant paths is somewhat similar to the analysis performed in CDMA rake receivers. The iter_max variable is a "safety valve" to terminate the procedure and avoid infinite looping.

| PROCEDURE: Coarse Metrics 243 |  |
|---|---|
| 5.1. | max_indx = $\text{argmax}_i |c(i)|^2$; |
| 5.2. | peak= $|c(\text{max\_indx})|^2$; |
| 5.3. | pwr_avg= $c^H c/L$; |
| 5.4. | instant_snr= peak/pwr_avg; |

Preferred implementations adopt a "greedy" strategy to identify the most likely path candidate from a measure vector c. Such "greedy" strategies are particularly effective in the intermediate CIR procedure while retaining the coarse metrics procedure as a controller to stop the iterative method.

Following its identification of significant paths, the intermediate CIR module 233 preferably identifies regions around the significant paths (again designated by an "X" in FIG. 3). These regions of tolerance, as noted by the sample spans 333, 335 and 337 in the example of FIG. 3, in aggregate can make up a mask on the intermediate CIR estimate. CIR estimator 237 preferably reacts to this mask to identify when the CIR estimate vector is updated at any given iteration. That is, the intermediate CIR module 233 preferably outputs information defining a mask for the intermediate CIR estimate specifying regions where CIR estimation module 237 will update the CIR estimate.

In operation, the intermediate CIR module 233 outputs an intermediate CIR estimate and a mask on this estimate (step 4.20). Preferably the CIR estimator 237 operates in a similar manner and cooperates with the fine metrics module 247 to iteratively improve the intermediate CIR estimate (instead of the initial CIR estimate on which the intermediate CIR estimator 233 operates). The CIR estimator 237 preferably implements a similarly modified matching pursuit strategy as was used within the intermediate CIR estimator 233 to facilitate this performance. The procedure preferably implemented in CIR estimate module 237 is detailed below, and the fine metrics module 247 procedure is set out in detail below that.

Step 4.19 creates the mask for the intermediate CIR. This is a simple method, whereby the stored indices of maximum values (in step 4.12) are examined and a range of intermediate CIR locations are enabled. For example, if d(1) has a value of 10, then the locations in the mask inclusive of $10-d_{range}$ and $10+d_{range}$ are set to 1. The initial L-values of the vector m are all zeros. The value of $d_{range}$ is preferably determined via simulations. At the end of this process, the vector m will have a 1 where a refined value of $h_1$ may be computed, and zero where it is unlikely that a path is present. In effect, the mask is a non-linear high-likelihood noise filter in updating the CIR estimate.

| PROCEDURE: CIR Estimate 237 |
| --- |
| 6.1. compute a transmit pilot auto-covariance matrix A. |
| 6.2a. input an L-sample intermediate CIR ($h_i$) |
| 6.2b. set iter_max_mask and iter_max; |
| 6.2c. input the mask vector m; |
| 6.3. initialize: |
|     $h_e$= 0; iter= −1; iter_mask= 0; |
|     c= $h_0$; exit_while= 0; |
| 6.4. while( not( exit_while ) )do |
| 6.5.     iter= iter + 1; |
| 6.6.     [max_indx, peak ] = Fine_Metric( c ); |
| 6.7.     c= c − c(max_indx)*A(:, max_indx); |
| 6.8.     if m(max_index) == 1 then |
| 6.9.         $h_e$(max_idx)= $h_e$(max_idx) + c(max_idx) |
| 6.10.         [ avg_snr ]= Fine_Metric( c, m, $h_e$ ); |
| 6.11.     else |
| 6.12.         iter_mask= iter_mask + 1; |
| 6.13.     end if |
| 6.14.     if( iter_mask < iter_max_mask ) then |
| 6.15.         exit_while= 1; |
| 6.16.     end if |
| 6.17.     if iter > iter_max then |
| 6.18.         exit_while= 1; |
| 6.19.     end if |
| 6.20. end while |
| 6.21. output $h_e$, avg_snr |

As noted in steps 4.1 and 6.1, the procedure involves a matrix A that contains information on the expected pilot locations. The receiver will know the location of pilots, which in turn correspond to columns in the FFT matrix used to compute the OFDM symbol at the transmitter. The procedure identifies the FFT matrix and extracts the relevant columns that represent the transmitted pilots. The process denotes the index of the columns in the FFT matrix with a set $\{r_k\}$ for k=1, 2, ... K. That is, there are K pilots in the OFDM symbol 112. For a given FFT matrix, FFT submatrix P includes the first K-rows of the L-columns indexed by $r_k$ (k=1, 2, ... K). Each element of the P matrix $p_{k,l}$ is given by, $$p_{k,l} = \frac{1}{\sqrt{N}} \exp(-i 2\pi r_k l / N) \qquad \text{EQ. 1}$$

where N is the FFT size of the transmitted OFDM symbol. Thus, preferred implementations compare channel measurements at those K frequencies with the equation, $$f_r = Ph \qquad \text{EQ.2}$$

where $f_r$ is the channel's frequency response (CFR) at the K frequencies known to have pilots. In particular compressive sensing reconstruction strategies, the matrix P is known as the "dictionary." Finally, the matrix A is defined simply as, $$A = P^H P. \qquad \text{EQ.3}$$

| PROCEDURE: Fine Metrics 247 |
| --- |
| 7.1. max_indx = $\mathrm{argmax}_i |c(i)|^2$; |
| 7.2. peak= $| h_e(\mathrm{max\_indx}) |^2$ masked by m on $h_e$ |
| 7.3. pwr_avg= $c^H c/L$; |
| 7.4. avg_snr= accumulate ( peak/pwr_avg ). |

Post CIR processing module 292 preferably reacts to the output $h_e$ from the CIR estimator 237 to transform the L-samples to an N-sample CFR. The corresponding OFDM symbol is equalized by a frequency equalizer 294 reacting to the N-sample CFR.

The CIR estimate $h_e$ offers other advantages in network-wide performance metrics by enabling the use of other sophisticated receiver functions. One such function is to exploit the diversity in CIRs between base stations to perform interference cancellation. Another preferred embodiment of the present invention has an interference canceller module 298 reacting to the CIR estimate $h_e$ to perform interference cancellation in the time and/or frequency domain. Aspects of interference cancellation are described, for example, in application Ser. No. 12/835,659, listing Fernando Lopez de Victoria as inventor and entitled "Communication System and Method Using Subspace Interference Cancellation," which application is hereby incorporated by reference in its entirety.

Another preferred embodiment has a MIMO module 290 reacting to the CIR estimate $h_e$. MIMO module 290 preferably receives simultaneous channels over a number of physical antennas at the receiver. The MIMO receiver most preferably accurately knows the CIR for each of the antennas to facilitate its proper operation.

After frequency equalization, the receiver preferably demodulates each of the carriers assigned to the user. As part of this process, the receiver may provide the avg_snr and/or the CIR estimate to a demodulation module 296. These metrics are particularly useful for high performance Viterbi decoders, as one example.

In the case of a highly precise CIR estimate, as is the case for output $h_e$ from module 237, it is possible to derive other measures useful to mobile receiver operation for subsequent processing such as in the demodulator 296 (or the demodulator 196 of FIG. 1). The fine metrics module 247 can be modified to provide other outputs such as doppler rates, and preferably include such calculations in the fine metrics procedure detailed above.

U.S. patent application Ser. No. 13/416,990, "OFDM Receiver with Time Domain Channel Estimation," filed Mar. 9, 2012 is incorporated in its entirety for its teachings including with respect to OFDM receivers and time domain channel estimation. U.S. patent application Ser. No. 13/835,305, entitled "Block Time Domain Channel Estimation in OFDM System," filed Mar. 15, 2013 and naming Steven C. Thompson and Fernando Lopez de Victoria as inventors is incorporated in its entirety including for its teachings with respect to OFDM receivers and time domain channel estimation.

Translation of pseudocode like that above and elsewhere in this document into circuitry is within the capabilities of persons of ordinary skill in this art. It will be appreciated that this procedure could be implemented through software in a processor or it could be implemented in circuitry in combination with memory. Where desirable or advantageous, the procedures discussed in this patent document can be implemented as hardware through, for example, a hardware design language. Alternately, the above procedures can be readily implemented in a digital signal processor or other processor that processes communication signals within a communication system. Those of ordinary skill will appreciate that the receiver described here can be implemented in a mixture of hardware and software elements as selected to achieve different objectives such as computational efficiency and power efficiency.

The present invention has been described in terms of certain preferred embodiments. Those of ordinary skill in the art will appreciate that various modifications and alterations could be made to the specific preferred embodiments described here without varying from the teachings of the present invention. Consequently, the present invention is not intended to be limited to the specific preferred embodiments described here but instead the present invention is to be defined by the appended claims.

What is claimed is:

1. An OFDM receiver comprising:
   an initial channel impulse response estimator that generates an initial channel impulse response having a number of samples in response to a received signal having one or more OFDM symbols;
   a time segment selector that selects a subset of samples from the initial channel impulse response as the subset of samples for analysis of an intermediate channel impulse response;
   an intermediate channel impulse response estimator that identifies paths within the subset of samples from the initial channel impulse response and generates an improved intermediate channel impulse response in a first iterative non-linear process;
   a channel impulse response estimator responsive to the intermediate channel impulse response estimator, the channel impulse response estimator performs a second iterative non-linear process to generate a channel impulse response; and
   an equalizer responsive to the channel impulse response and the OFDM symbol to generate an equalized OFDM symbol.

2. The OFDM receiver of claim 1, wherein the first and second non-linear processes are successive matching pursuit processes.

3. The OFDM receiver of claim 2, wherein the first and second non-linear processes are time domain processes.

4. The OFDM receiver of claim 3, further comprising a transform module that receives the channel impulse response, transforms the channel impulse response into a frequency domain representation, and provides the frequency domain representation of the channel impulse response to the equalizer, wherein the equalizer uses the frequency domain representation of the channel impulse response to generate the equalized OFDM symbol in the frequency domain.

5. The OFDM receiver of claim 1, wherein the time segment selector selects a span to ensure that significant paths are included in the span.

6. The OFDM receiver of claim 1, further comprising a mask generator that identifies intervals around each of a plurality of selected peaks included in the intermediate channel impulse response and generates mask information corresponding to intervals around each of the selected peaks.

7. An OFDM receiver comprising:
   an initial channel impulse response estimator that generates an initial channel impulse response having a number of samples in response to a received signal having one or more OFDM symbols;
   a time segment selector that selects a subset of samples from the initial channel impulse response as the subset of samples for analysis of an intermediate channel impulse response;
   an intermediate channel impulse response estimator that identifies paths within the subset of samples from the initial channel impulse response and generates an improved intermediate channel impulse response in a first non-linear process;
   a mask generator that identifies intervals around each of a plurality of selected peaks included in the intermediate channel impulse response and generates mask information corresponding to intervals around each of the selected peaks;
   a channel impulse response estimator responsive to the intermediate channel impulse response estimator, the channel impulse response estimator performs a second non-linear process to generate a channel impulse response; and
   an equalizer responsive to the channel impulse response and the OFDM symbol to generate an equalized OFDM symbol, wherein the mask generator provides the mask information as an input to the channel impulse response estimator.

8. The OFDM receiver of claim 7, wherein the intermediate channel impulse response estimator sequentially identifies and adds likely paths to a channel estimate vector.

9. An OFDM receiver comprising:
   an initial channel impulse response estimator that generates an initial channel impulse response having a number of samples in response to a received signal having one or more OFDM symbols;
   a time segment selector that selects a subset of samples from the initial channel impulse response as the subset of samples for analysis of an intermediate channel impulse response;
   an intermediate channel impulse response estimator that identifies paths within the subset of samples from the initial channel impulse response and generates an improved intermediate channel impulse response in a first non-linear process, wherein the intermediate channel impulse response estimator sequentially identifies and adds likely paths to an intermediate channel estimate vector and then iteratively uses a current intermediate channel estimate vector to evaluate an intermediate stopping function for generating the intermediate channel impulse response;

a channel impulse response estimator responsive to the intermediate channel impulse response estimator, the channel impulse response estimator performs a second non-linear process to generate a channel impulse response; and an equalizer responsive to the channel impulse response and the OFDM symbol to generate an equalized OFDM symbol.

10. The OFDM receiver of claim 9, wherein the intermediate stopping function determines if an instantaneous signal to noise ratio based on the intermediate channel estimate vector is less than a first threshold value.

11. The OFDM receiver of claim 10, further comprising a mask generator that identifies intervals around each of a plurality of selected peaks included in the intermediate channel impulse response and generates mask information corresponding to intervals around each of the selected peaks.

12. The OFDM receiver of claim 11, wherein the mask generator provides the mask information as an input to the channel impulse response estimator.

13. The OFDM receiver of claim 9, wherein the channel impulse response estimator sequentially identifies and adds likely paths to a channel estimate vector and then iteratively uses a current channel estimate vector to generate the channel impulse response.

14. The OFDM receiver of claim 13, wherein the channel impulse response estimator generates an average signal to noise ratio.

15. The OFDM receiver of claim 13, further comprising a mask generator that identifies intervals around each of a plurality of selected peaks included in the intermediate channel impulse response and generates mask information corresponding to intervals around each of the selected peaks.

16. The OFDM receiver of claim 15, wherein the mask generator provides the mask information as an input to the channel impulse response estimator.

17. An OFDM receiver comprising:
an initial channel impulse response estimator that generates an initial channel impulse response having a number of samples in response to a received signal having one or more OFDM symbols;

a time segment selector that selects a subset of samples from the initial channel impulse response as the subset of samples for analysis of an intermediate channel impulse response;

an intermediate channel impulse response estimator that identifies paths within the subset of samples from the initial channel impulse response and generates an improved intermediate channel impulse response in a first non-linear process;

a channel impulse response estimator responsive to the intermediate channel impulse response estimator, the channel impulse response estimator performs a second non-linear process to generate a channel impulse response; and an equalizer responsive to the channel impulse response and the OFDM symbol to generate an equalized OFDM symbol, wherein the channel impulse response estimator sequentially identifies and adds likely paths to a channel estimate vector and then iteratively uses a current channel estimate vector to generate the channel impulse response.

18. The OFDM receiver of claim 17, wherein the channel impulse response estimator generates an average signal to noise ratio.

19. The OFDM receiver of claim 17, further comprising a mask generator that identifies intervals around each of a plurality of selected peaks included in the intermediate channel impulse response and generates mask information corresponding to intervals around each of the selected peaks.

20. The OFDM receiver of claim 19, wherein the mask generator provides the mask information as an input to the channel impulse response estimator.

* * * * *